United States Patent [19]

Doss

[11] 3,817,223

[45] June 18, 1974

[54] ANTI-AIR POLLUTION SYSTEM FOR INTERNAL COMBUSTION ENGINE

[76] Inventor: Joseph H. Doss, 27329 Wilson, Dearborn Heights, Mich. 48127

[22] Filed: Oct. 21, 1970

[21] Appl. No.: 82,859

Related U.S. Application Data

[63] Continuation-in-part of Ser. No. 769,636, Oct. 22, 1968, abandoned.

[52] U.S. Cl. ....... 123/32 SP, 123/32 SA, 123/32 ST

[51] Int. Cl. .......... F02b 17/00

[58] Field of Search .......... 123/Inq.

[56] References Cited

UNITED STATES PATENTS

| | | | |
|---|---|---|---|
| 1,483,619 | 2/1924 | Smith | 123/191 O |
| 1,649,700 | 11/1927 | Jobes | 123/32 ST |
| 2,023,634 | 12/1935 | Boudet | 123/32 ST |
| 2,025,362 | 12/1935 | Starr | 123/32 |
| 2,196,860 | 4/1940 | Groth | 123/32 ST |
| 2,435,659 | 2/1948 | Summers | 123/32 SP |
| 2,878,299 | 3/1959 | Starr | 123/32 SP |
| 2,942,594 | 6/1960 | Turlay | 123/191 O |
| 3,408,992 | 11/1968 | Von Seggern et al. | 123/32 ST |
| 3,418,981 | 12/1968 | Von Seggern et al. | 123/32 ST |
| 3,443,552 | 5/1969 | Von Seggern et al. | 123/32 ST |

*Primary Examiner*—Laurence M. Goodridge

[57] ABSTRACT

The present internal combustion engine has a negative angle curvature shaped combustion chamber for each cylinder of the engine, each of which combustion chambers has a pair of intake valves, one valve being located at the vertex of the combustion chamber adjacent ignition means and a second intake valve at the base of the combustion chamber where an exhaust valve is also located, for supplying two gas-air fuel mixtures to the combustion chamber.

8 Claims, 4 Drawing Figures

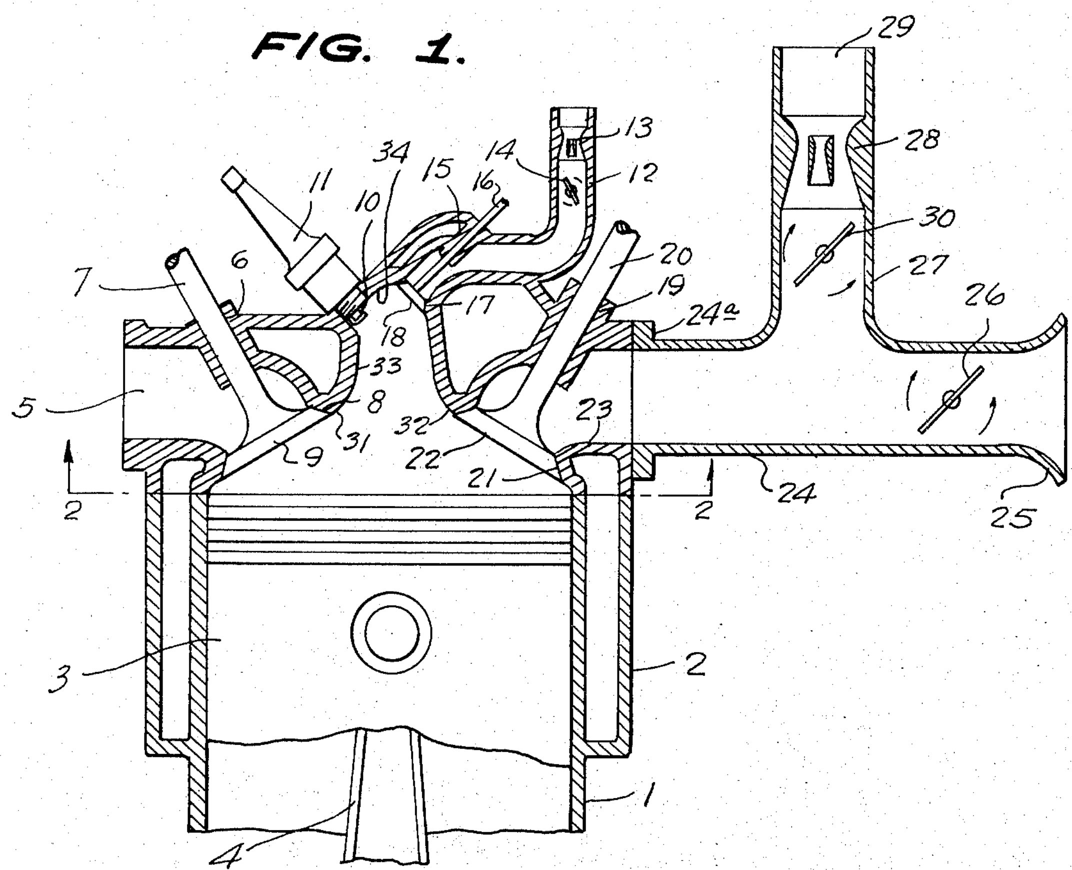
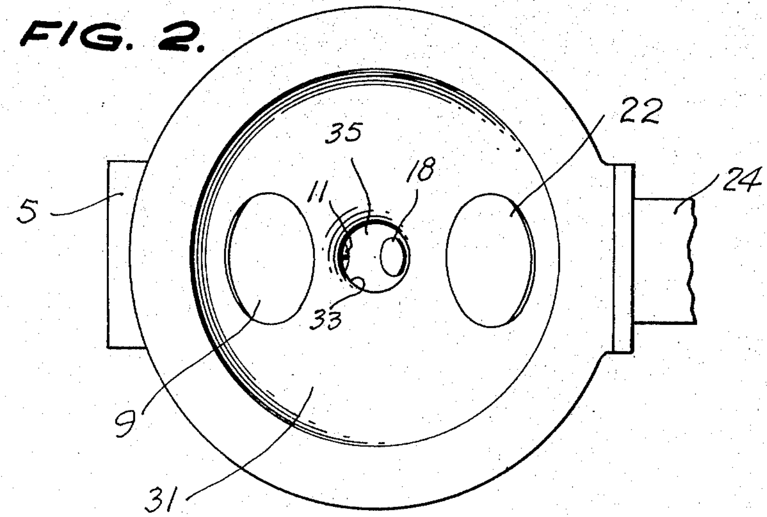
INVENTOR.
JOSEPH H. DOSS,
BY
Linton and Linton
ATTORNEYS.

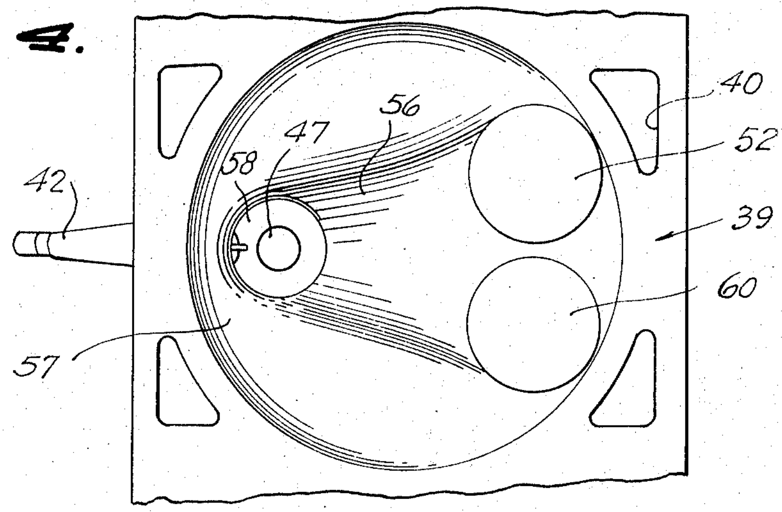
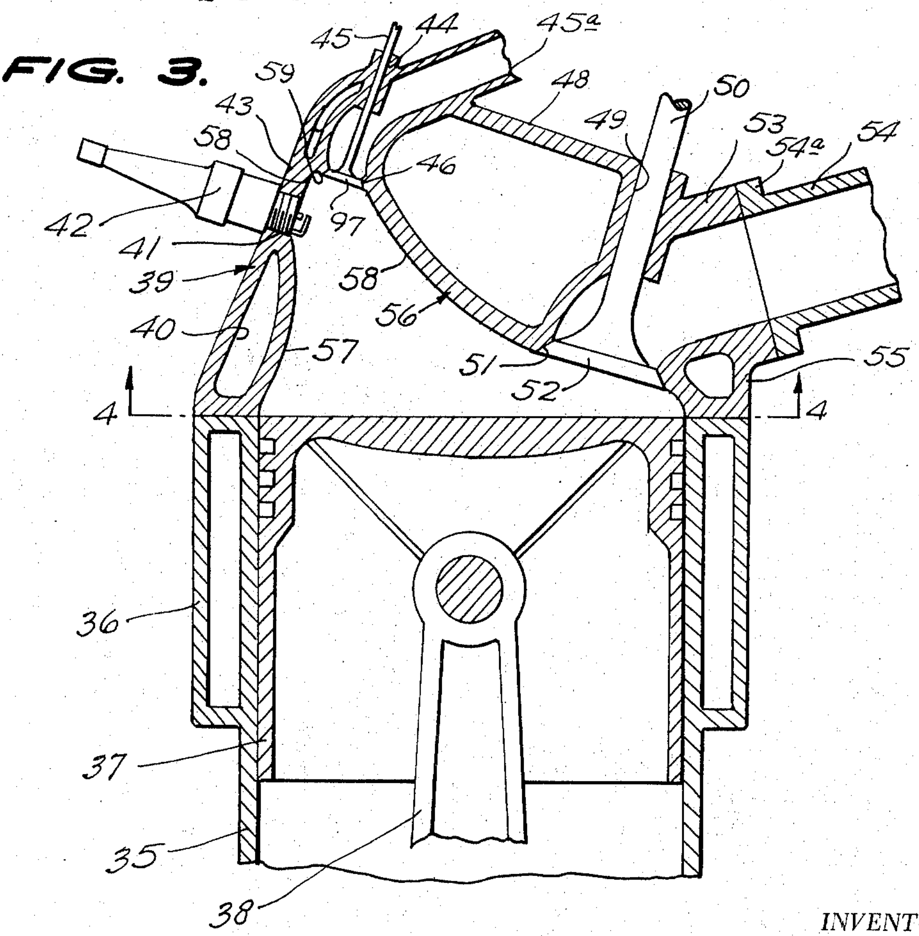
INVENTOR.
JOSEPH H. DOSS,
BY
Linton and Linton
ATTORNEYS.

ANTI-AIR POLLUTION SYSTEM FOR INTERNAL COMBUSTION ENGINE

The present application is a Continuation-In-Part of my co-pending application Ser. No. 769,636 filed Oct. 22, 1968, now abandoned.

DESCRIPTION

The present invention is concerned with internal combustion engines and more particularly with an improvement in the combustion chamber of each cylinder of such engines.

The principal object of the present invention is to provide each cylinder of an internal combustion engine with a negative angle curvature combustion chamber into which two separate fuelair mixtures are introduced for providing excess oxygen thereto at all times for reducing air pollutants therein, permitting full compression at all times therein by adding fuel to the air mixture in the combustion chamber as the load on the engine increases, increase of the thermal efficiency of the engine, and to permit a smooth flow of the fuel at the vertex of the combustion chamber with a minimum of turbulence.

Further objects of the invention will be in part obvious and in part pointed out in the following description of the drawings, in which:

FIG. 1 is a cross-sectional view through an upper portion of an internal combustion engine cylinder in accordance with the present invention;

FIG. 2 is a bottom view of the cylinder head taken on line 2—2 of FIG. 1;

FIG. 3 is a cross-sectional view of the upper portion of a modified form of internal combustion engine cylinder in accordance with the present invention; and FIG. 4 is a bottom view of the cylinder head of said modified form of cylinder taken on line 4—4 of FIG. 3.

Referring to more in detail to the accompanying drawings wherein like and corresponding parts are designated by similar reference characters, numeral 1 indicates a cylinder having a liquid cooling jacket 2, a piston 3 slideable in said cylinder and a connecting rod 4 pivotally connected to said piston, which elements are similar to the same elements in a conventional internal combustion engine.

The head of the cylinder has an exhaust manifold 5 with guide opening 6 in the top of said exhaust manifold with valve stem 7 slideably extending through said guide. A valve seat 8 is provided at the inner end of said exhaust manifold for receiving valve head 9 connected to stem 7 for closing said exhaust manifold at other times than during the exhaust stroke of piston 3.

A threaded opening 10 is provided adjacent the vertex of the combustion chamber with spark plug or a similar fuel igniter 11 in threaded engagement therewith.

A fuel intake tube 12 is attached to or integral with said head adjacent the vertex of the combustion chamber and opening therein adjacent said igniter 11. Said tube has a restricted throat 13, representing a conventional down draft carburator, below which is pivotally mounted on a butterfly control valve 14. Also the open end of tube 12 is connected to a supply of fuel (not shown). A valve guide opening 15 opens into said tube 12 and has valve stem 16 slideably extending therethrough. The inner end of tube 12 opens into said combustion chamber vertex and has a valve seat 17 to be opened and closed, at times, by valve head 18 connected to stem 16.

A valve guide opening 19 is also provided in said head with valve stem 20 slideably extending therethrough, while said head also has a valve seat 21 provided therein for at times being opened and closed by valve head 22 attached to stem 20 which valve head 22 is larger in diameter than the diameter of valve head 18.

An intake port 23 is provided in said head diametrically opposite to exhaust manifold 5. An inverted T-shaped tube 24 is fixedly attached at one end to intake port 23 by conventional means such as bolts (not shown) extending through flange 24a from said head and retained by nuts on said bolts. Tube 24 has an outwardly flared open end 25 for air intake, a butterfly valve 26 pivotally mounted in said tube in front of end 25, an upright neck 27 with a restricted portion 28, representing a conventional down draft carburator, adjacent open end 29 and a butterfly valve 30 pivotally mounted in said neck below the restricted portion 28. Neck opening 29 is connected to a supply of fuel (not shown).

Valve stems 7 and 20 are operated by conventional camming mechanism (not shown) from the engine by a conventional timing mechanism (not shown). Spark plug 11 is also ignited from time to time by a conventional ignition system (not shown).

The interior face 31 of said cylinder head is of a negative angle curvature shape with the vertex 34 centered on the diameter of cylinder 1. Thus, the annular lower portion 32 of said head interior face 31 slants inwardly from the bore of cylinder 1 and curves inwardly and upwardly contiguous with the inwardly slanting upper portion 33 of said head interior face 31 to a concave closed top at vertex 34.

The exhaust valve seat 8 is located at one side of said head interior face lower portion 32 with intake valve seat 21 also located on said lower portion 32, but diametrically opposite valve seat 8. The opening 10 for igniter 11 is located at one side of the head interior upper portion 33, while intake valve seat 17 is also located on said upper portion 33, but diametrically opposite to igniter 11.

The operation of the engine of FIGS. 1 and 2 is similar to that of conventional gasoline engines, with the exception of the combustion chamber having a negative angle curvature shape provided by the interior head face 31 and a pair of intake valves 18 and 22. That is, a pyrogenic gas-air mixture is homogeneously mixed through a carburator (not shown) and drawn through tube 12 past the open intake valve head 18 into the combustion chamber adjacent the igniter 11 upon the down stroke of piston 3 when exhaust valve 9 is closed. Said igniter is located in the combustion chamber at the point where the highly combustible gasses will be compressed in the vertex of the negative angle curvature shape combustion chamber at the time of ignition.

A further gas-air mixture enters tube 24 from a carburator (not shown) attached to neck opening 29 and additional air from opening 25 which gas-air mixture enters through open intake valve 22 also on the down stroke of piston 3 with exhaust valve 9 closed and flows in the direction of the receeding piston 3 permitting a smooth flow of pyrogenic mixture through intake valve 18 at the same time. The pyrogenic mixture filling the upper portion 33 of the combustion chamber is compressed on the compression stroke of piston 3 when valves 18 and 22 are closed. At such time the flow of the pyrogenic mixture reverses and is compressed in the vicinity of igniter 11 whereupon igniter 11 receives current igniting the fuel adjacent thereto projecting a flame and expanding gasses in the direction of piston 3 driving the same downwardly. The negative angle curvature shape provided by head inner face 31 is proportional to the expanding rate of flame propagation and expanding gasses. Thus the ignited mixture expands from vertex 34 downwardly increasing the compression of the mixture in the combustion chamber and the corresponding gas temperature to beyond the ignition temperature of all hydrocarbons in the combustion chamber. Therefore the combustion of all hydrocarbons is rapid and as excess oxygen is provided by tube inlet 25, air pollutants, such as carbon monoxide and unburned hydrocarbons passing from exhaust valve 9 are reduced to below acceptable amounts. Also the thermal efficiency of the engine is increased without the use of leaded fuels.

The present engine has been conceived for use with light fuels, such as gasoline, alcohol or nitro-benzene or any combination thereof or a heavy fuel may be used in combination. For example, a gasoline-air mixture can be fed through valve 18 and a heavy fuel oil-air mixture through valve 22. Air alone or kerosene-air, alcohol-air or a powdered coal-air mixture, powdered wood-air mixture or any other powdered combustible fuel-air mixture can also be fed through valve 22 instead of the fuel oil-air mixture.

Valves 14 and 30 control the admission of the fuel-air, a pyrogenic mixture. Valve 26 controls the air admission from opening 25. As the work load increases valve 26 correspondingly closes to admit more fuel-air mixture through valve 30. Under full power, valve 26 is completely closed and valve 30 is fully open.

It is to be appreciated that valves 9, 18 and 22 and igniter 11 are timed in the conventional manner of operation in accordance with the movement of piston 3.

The modification to the present engine, as shown in FIGS. 3 and 4 has an open top cylinder 35, liquid cooling jacket 36, piston 37 slideable in said cylinder, and connecting rod 38 pivotally connected to said piston 37. A cylinder head 39 is mounted on and closes the open top of cylinder 1 and is attached thereto by conventional means such as for example, bolts (not shown) extending from said cylinder through said head and retained by nuts (not shown).

Said head has liquid cooling jacket 40, threaded igniter opening 41 in side 43, igniter 42 in threaded engagement therewith, valve guide opening 44 for valve stem 45 slideable therein, valve seat 46 for valve head 47 attached to valve stem 45, intake tube **45*a* extending from head top 48 to the inside of said head with valve head 47 for opening and closing the same. Said tube 45*a*** is also attached to a conventional carburator and source of fuel (not shown).

Said head top 48 also has valve stem guide 49 for valve stem 50 extending to intake manifold 53. A valve seat 51 is provided at the inner end of said intake manifold for receiving valve head 52 attached to valve stem 50, to open and close said intake manifold. A tube 54 is attached to side 55 of said head in line with said intake manifold, by conventional means such as bolts (not shown) extending through flange **54*a* into threaded engagement with said head side 55** and to a carburator and source of fuel (not shown).

The interior face 56 of head 39 is of a shape having a negative angle curvature with the vertex 59 thereof in line with a diameter of cylinder 35, but off-set relative to the longitudinal axis of said cylinder. Thus, said face 56 has a short side 57 and a longer side 58 when viewed as in FIG. 3, above a diameter of said cylinder 35. Face 56 thus provides an off-set vertex negative angle curvature shape combustion chamber above piston 37. Igniter 42 and intake valve 47 are positioned at the vertex 59, while intake valve 52 is located at the base of side 58 of head face 56. However, valve 52 is also located at one side of the cylinder diameter on which vertex 59 is in alignment, while an exhaust valve 60 is located on the opposite side of said cylinder diameter to valve 52, but also at the base of the longer side 58 of head face 56 as shown in FIG. 4.

The operation of the engine as described for FIGS. 3 and 4 is similar to that as described for the engine of FIGS. 1 and 2. Valve stems 45 and 50 are operated by the conventional cam mechanism, preferrably of the overhead cam type, (not shown), controlled by a timing mechanism (not shown) in coordination with the piston 37. Likewise the igniter 42 is supplied with current from a conventional ignition system (not shown) also in coordination with piston 37. Fuel and air is supplied to the carburators and past control valves (not shown) to tubes **45*a* and 54 in the same manner as described for the engine of FIGS. 1 and 2. Also the fuel-air mixture to tube 45*a* is the same as described for tube 12 and the fuel-air mixture for tube 54 is the same as for tube 24. Thus the mixture of gas and air for tube 45*a* is a highly combustible mixture of gas-air ratio which enters the combustion chamber in the vicinity of igniter 42 through valve 47. The ignition of the fuel mixture from valve 47 by igniter 42 increases the temperature in the combustion chamber and propagates throughout the combustion chamber. The fuel-air mixture from valve 47 serves as an ignition accelerator for the fuel-air mixture or air which enters by valve 52. Said fuel-air mixture or air from valve 52 may be of any gas-air ratio from 100 percent air to a hige combustion gas-air ratio. Valves 26 and 30 are synchronized so that valve 30 is wide open when valve 26** is closed and vice versa.

The engine operates at full compression at all times and fuel is added by valve 52 as additional power is needed. Also the engine operates with excess oxygen at all times reducing the air pollutants such as carbon monoxide and unburned hydrocarbons in the combustion chamber, but is capable of full power on emergency demands.

In both forms of the invention, that is the engine of FIGS. 1 and 2 and that of FIGS. 3 and 4, there is only shown one cylinder, but it is to be appreciated that the same arrangement can be employed for each cylinder of multi-cylinder engines.

The engines are capable of modification and such changes thereto as come within the scope of the appended claims is deemed to be a part of the present invention.

I claim:

1. In an internal combustion engine for use with a pyrogenic fuel-air mixture, including at least one cylinder with a piston slideable therein, a head of said cylinder having at least a small intake valve opening and having an inner face of a configuration defining a negative angle curvature combustion chamber with a calculated expanding curvature from said small intake valve opening at the vertex of said combustion chamber spaced above said cylinder flaring out in a continuously accelerated expansion to the diameter of the cylinder, an igniter extending through said head into the vertex portion of said combustion chamber, a fuel intake valve opening in said head inner face at said vertex, a second fuel intake valve opening in said head inner face at the base portion thereof, an exhaust valve also opening at the base portion of said head inner face, means for supplying fuels to said intake valves and means for operating said valves and igniter in coordination with the engine piston.

2. In an internal combustion engine as claimed in claim 1, wherein said combustion chamber vertex is located in line with the longitudinal axis of the piston.

3. In an internal combustion engine as claimed in claim 1, wherein said combustion chamber vertex is located above a diameter of the piston, but offset relative to the longitudinal axis of said piston.

4. In an internal combustion engine as claimed in claim 1, wherein said head inner face has an inwardly curved lower portion and an inwardly curved upper portion continuous with said lower portion, but slanting inwardly on less of a slant than said lower portion, said second intake valve and said exhaust valve being located on said lower portion and said igniter and first mentioned intake valve being located on said upper portion.

5. In an internal combustion engine as claimed in claim 1, wherein the fuel supplied said first mentioned intake valve is a highly combustible fuel-air mixture and the fuel supplied said second intake valve is of a gas-air ratio from 100 percent air to a high combustible fuel-air mixture.

6. In an internal combustion engine as claimed in claim 1, wherein a fuel intake tube is connected to said second intake valve and has a fuel-air passage and an air passage, coordinated valves are mounted in said passages to control the intake ratio of fuel-air and air therethrough.

7. In an internal combustion engine as claimed in claim 1, wherein said head inner face has a side portion extending from the base to the vertex of said head inner face which is of greater length than the remaining side portion of said face, said exhaust valve and said second intake valve being located on said first mentioned face side portion and on opposite sides of a diameter of said cylinder and said combustion chamber vertex being located above said diameter of said cylinder.

8. In an internal combustion engine as claimed in claim 1, wherein the flame propagation is controlled at a uniform rate by the negative angle curvature combustion chamber wherein the compression is increased by the ignition 40° advance from dead center, whereas the flame propagates from the vertex of the combustion chamber travelling towards the piston and the piston is travelling toward the vertex increasing the compression from two points at the same time so that the maximum pressure is reached 5° past dead center, producing a higher torque than the convention combustion engine.

* * * * *